G. E. ASPINWALL & J. TERWAY.
DEVICE FOR SCREENING GRAIN.
APPLICATION FILED JULY 28, 1914.
1,133,421. Patented Mar. 30, 1915.
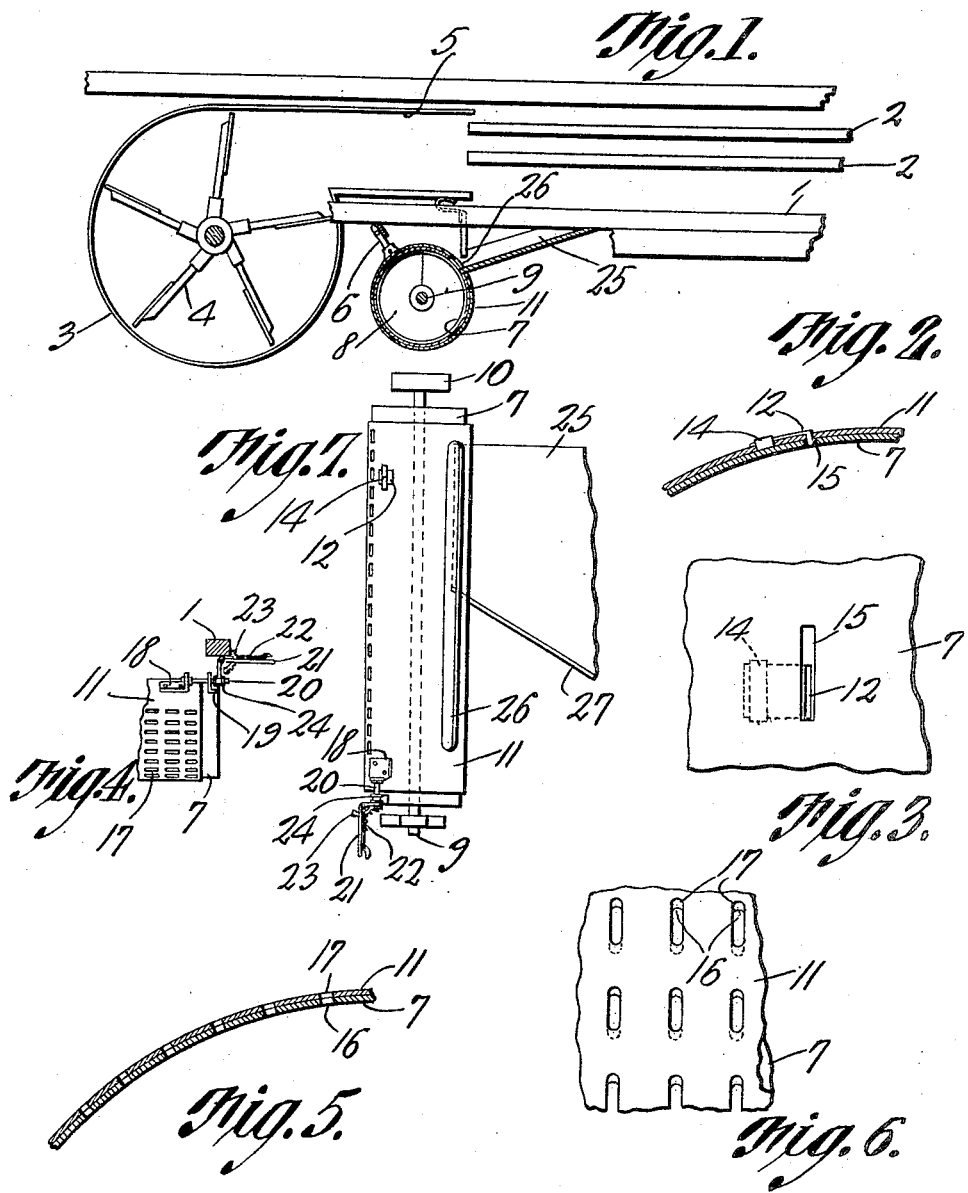
Witnesses
F. B. Wooden
M. E. McCarthy
G. E. Aspinwall and
J. Terway Inventors
by C. A. Snow & Co.,
Attorneys

UNITED STATES PATENT OFFICE.

GEORGE E. ASPINWALL AND JOE TERWAY, OF BEAULIEU, MINNESOTA.

DEVICE FOR SCREENING GRAIN.

1,133,421.  Specification of Letters Patent.  Patented Mar. 30, 1915.

Application filed July 28, 1914. Serial No. 853,648.

*To all whom it may concern:*

Be it known that we, GEORGE E. ASPINWALL and JOE TERWAY, citizens of the United States, residing at Beaulieu, in the county of Mahnomen, State of Minnesota, have invented a new and useful Device for Screening Grain, of which the following is a specification.

The device forming the subject matter of this application is a grader or cleaner, adapted to be applied to a threshing machine of standard construction, for the purpose of grading, according to its size, or cleaning the grain after the same has been separated from the straw, the construction being such that the grain may be graded and cleaned on the threshing machine and without running the grain through a separate grader after the grain passes clear of the threshing machine.

The invention aims to improve the grading apparatus by providing means for producing relative movement between a pair of perforated cylinders, to cause the perforations in the cylinders to overlap to a greater or less extent thereby defining the size of the grading openings.

Another object of the invention is to provide novel means for preventing the cylinders from having relative rotation when one cylinder is moved longitudinally of the other to vary the size of the grading openings.

It is within the scope of the invention to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

In the accompanying drawing:—Figure 1 is a vertical sectional detail illustrating the device forming the subject matter of this application applied to a portion of a thresher of standard construction; Fig. 2 is a fragmental transverse section showing the interengaging elements upon the cylinders whereby the outer cylinder is prevented from moving circumferentially of the inner cylinder; Fig. 3 is a plan view illustrating a portion of the inner surface of the inner cylinder, Fig. 3 showing the structure set forth in Fig. 2; Fig. 4 is a fragmental cross section showing the cylinders in elevation and illustrating particularly the means whereby relative longitudinal movement between the cylinders is produced; Fig. 5 is a fragmental transverse section showing particularly the coöperating relation existing between the perforations of the respective cylinders; Fig. 6 is a fragmental side elevation showing the relations existing between the perforations of the cylinders; and Fig. 7 is a top plan of the cylinders and attendant parts.

The device herein disclosed is adapted to be applied to threshing machines of widely different constructions, but by way of illustration, and in order to render the application of the invention clear, there is shown a portion of the frame of a threshing machine, the frame including a side beam 1. The grain sieves are shown at 2, the numeral 3 indicating the blower casing, the blower being shown at 4, and the outlet of the blower casing appearing at 5. Upheld in any suitable manner upon the frame of the threshing machine, for instance through the instrumentality of a connection 6, is an inner cylinder 7 in which operates a conveyer, ordinarily in the form of an auger 8, the auger being carried by a shaft 9 actuated by a pulley 10 or otherwise. The foregoing details are common to many forms of threshing machines and need not be described in greater detail.

Surrounding the inner cylinder 7 closely but mounted to slide longitudinally thereon to a limited extent is an outer cylinder 11. Attached as shown at 14 to the outer cylinder 7 is an angular stop finger 12, terminally received in an elongated slot 15 formed in the inner cylinder 7. The construction at the point indicated is such that through the instrumentality of the stop finger 12, the outer cylinder 11 cannot rotate upon the inner cylinder 7 but may slide longitudinally thereon, within the limits defined by the length of the slot 15 as compared with the finger 12, Fig. 3 being noted particularly. In the inner cylinder 7 there are formed a plurality of openings 16, coöperating with openings 17 in the outer cylinder 11. By moving the outer cylinder 11 in the direction of its length, the openings 16 and 17 in the respective cylinders may be made to coincide to a greater or less extent, thereby varying the size of the grading openings in both cylinders formed by the coöperating openings of the respective cylinders.

In order to impart a longitudinal movement to the outer cylinder 11 thereby to cause the perforations 16 and 17 to coöperate and co-incide to a greater or less extent, a shifting mechanism for the outer cylinder is provided, the same embodying a bracket 18 attached to the outer cylinder 11 adjacent one end, a bracket 19 being attached to the inner cylinder 7. Slidable in the bracket 19 but restrained against longitudinal movement in the bracket 18 is a connection 20 which may be a bolt. The outer end of the connection or bolt 20 passes through one arm of a lever 21 fulcrumed intermediate its ends on the beam 1. Nuts 24 are threaded on the connection or bolt 20 and engage opposite sides of the lever 21, to permit an adjustment between the connection and the lever, the lever preferably being of angular form. The lever 21 may carry a latch 22 adapted to coöperate with a segment 23 on the beam 1.

It will now be understood, notably when Fig. 4 is examined, that by tilting the lever 21 on its fulcrum, the outer cylinder 11 will be moved in the direction of its length, to vary the size of the grading openings, the latch mechanism 22 coöperating with the segment 23 to hold the outer cylinder in any of its adjusted positions.

The sieves 2 coöperate with a grain chute 25 entering elongated slots 26 in the cylinders 7 and 11, one side wall 27 of the shoe 25 being laterally inclined so that the grain will be delivered close to one end of the cylinder 7.

In practical operation, the grain traverses the shoe 25 and enters the inner cylinder 7, the grain being advanced therealong by the conveyer or auger 8. As the grain is advanced, it will be separated according to its size, some of the grain passing through the perforations 16—17 and the rest of the grain passing out of the cylinders at one end. Considered in a different aspect, the device herein disclosed may be employed merely for cleaning the grain, the grain passing through the openings defined by the sorting perforations 16—17 and foreign matter, too large to pass through the perforations, being expelled from the cylinders at one end, by the action of the auger 8.

We are aware that it is not new to connect a pair of cylinders for relative longitudinal movement thereby to vary the size of the grading openings, and to fix with respect to the inner of said cylinders, an auger which revolves with both cylinders. The present invention, however, possesses manifest advantages over a structure of the sort above described in that in the present invention, relative longitudinal movement between the cylinders thereby to vary the size of the grading openings may take place while the machine is in operation, that is, while the conveyer or auger is rotating. It is therefore unnecessary to stop the machine, the controlling lever merely being actuated to move the movable cylinder, and the operator noting the effect produced, so far as grading is concerned, while the auger is rotating. This adjustment may be made rapidly and quickly, and a minimum amount of material is wasted during the adjusting process. Further, much time is saved in carrying out the adjusting operation. Owing to the fact that the cylinders are held against rotation, it is possible to permit the shoe 25 to discharge through the side walls of the cylinders, something, obviously, which would not be possible if the cylinders were rotated. Again, since the cylinders do not rotate, the actuating lever which moves the movable cylinder may be placed on some rigid part of the machine frame, in a fixed location.

Having thus described the invention, what is claimed is:—

1. In a threshing machine, a grain grader embodying an outer cylinder and an inner cylinder, the cylinders having coöperating perforations defining grading openings; means for holding both of the cylinders against rotation; a conveyer rotatable within the inner cylinder; and means for producing relative movement between the cylinders in the direction of the length of the cylinders to vary the size of the grading openings while the conveyer is rotating.

2. In a threshing machine, a frame; a grain grader held by the frame and including an outer cylinder and an inner cylinder, the cylinders having coöperating perforations defining grading openings; means for holding both cylinders against rotation; a conveyer movable within the inner cylinder and with respect to the inner cylinder; interengaging elements on the cylinders for holding the outer cylinder for right line movement on the inner cylinder and constituting a part of the means for holding the cylinders against rotation; a lever fulcrumed on the frame; an operative connection between the lever and the outer cylinder; a latch on the lever; and a frame supported segment with which the latch coöperates.

3. In a threshing machine, a grain grader embodying an outer cylinder and an inner cylinder, the cylinders having coöperating perforations defining grading openings; a conveyer movable within the inner cylinder and with respect to the inner cylinder; means for moving the outer cylinder longitudinally of the inner cylinder to vary the size of the grading openings; and interengaging elements on the cylinders for holding the outer cylinder against rotation on the inner cylinder and means for holding the inner cylinder against rotation.

4. In a threshing machine, a grain grader embodying an outer cylinder and an inner cylinder, the cylinders having coöperating perforations defining grading openings, the cylinders being provided with elongated slots; a grain chute entering the slots; a conveyer movable within the inner cylinder; means for imparting a right line movement to the outer cylinder to vary the size of the grading openings; interengaging elements on the cylinders for holding the outer cylinder for right line movement, thereby to maintain the perforations of the respective cylinders and the slots thereof respectively in alinement and means for holding the inner cylinder against rotation.

In testimony that we claim the foregoing as our own, we have hereto affixed our signatures in the presence of two witnesses.

GEORGE E. ASPINWALL.
JOE TERWAY.

Witnesses:
 FRANK E. JOHNSON,
 JAMES MacINTOSH.

Copies of this patent may be obtained for five cents each, by addressing the "Commissioner of Patents, Washington, D. C."